United States Patent [19]

Nowak

[11] 4,201,642

[45] May 6, 1980

[54] RADIATION-CURABLE COATING COMPOSITION HAVING UTILITY AS A MOISTURE BARRIER FILM

[75] Inventor: Michael T. Nowak, Westfield, N.J.

[73] Assignee: Celanese Corporation, New York, N.Y.

[21] Appl. No.: 944,034

[22] Filed: Sep. 19, 1978

[51] Int. Cl.$^2$ ............................................. C08F 8/00
[52] U.S. Cl. ........................ 204/159.17; 204/159.15; 427/54.1; 428/486; 428/511; 428/514
[58] Field of Search ................... 260/28.5 B, 28.5 D, 260/28.5 A, 3.5; 427/54; 204/159.15, 159.17

[56] References Cited

U.S. PATENT DOCUMENTS

| | | | |
|---|---|---|---|
| 2,194,690 | 3/1940 | Clayton et al. | 260/3.5 |
| 2,252,485 | 9/1941 | Hull | 260/28.5 D |
| 2,301,959 | 11/1942 | Lanning | 260/28 |
| 2,388,326 | 11/1945 | Hyden et al. | 260/17 R |
| 2,490,536 | 12/1949 | Murphy et al. | 260/27 |
| 3,200,093 | 8/1965 | Saver et al. | 260/28.5 D |
| 3,944,717 | 3/1976 | Hacker et al. | 174/23 C |

*Primary Examiner*—Richard B. Turer
*Attorney, Agent, or Firm*—Kenneth A. Genoni

[57] ABSTRACT

This invention provides an ultraviolet radiation-curable coating composition which after curing has utility as a moisture barrier film for the protection of substrates such as paper and cardboard.

Illustrative of the invention radiation-curable composition is a blend of components comprising (1) chlorinated rubber; (2) chlorinated paraffin; (3) vinyl acetate; (4) trimethylolpropane triacrylate; (5) photoinitiator; and (6) heat and light stabilizer for the chlorocarbon components. The invention composition cures as a substantially 100 percent solids system within one second at room temperature when exposed to ultraviolet radiation.

10 Claims, No Drawings

RADIATION-CURABLE COATING COMPOSITION HAVING UTILITY AS A MOISTURE BARRIER FILM

BACKGROUND OF THE INVENTION

There has been continuing research effort to develop resin systems which are adapted to be cast into supported or self-supported films having flame, solvent and mildew-resisting properties, and more particularly, moisture barrier properties. Many of the developed resin systems characteristically contain a high content of halogen atoms to impart the moisture barrier and other desirable properties inherent in the systems.

U.S. Pat. No. 2,129,370 describes a sheet article suitable for wrapping purposes, characterized by being heat sealing, transparent and highly resistant to moisture vapor. The article consists of a regenerated cellulose sheet having a coating thereon composed essentially of a rubber hydrochloride and one or more substances selected from paraffin wax, chlorinated diphenyl, polycoumarone, rosin and dammar.

U.S. Pat. No. 2,194,690 describes a coating and impregnating composition for cellulosic materials comprising chlorinated paraffin, chlorinated rubber, tricresyl phosphate, pigment, filler, zinc borate and volatile solvent.

U.S. Pat. No. 2,252,485 describes a coating composition which consists of chlorinated high molecular weight iso-olefin polymer and chlorinated paraffin dissolved in a volatile organic solvent.

U.S. Pat. No. 2,301,959 describes the preparation of moistureproof wrapping paper by the coating of a base formed of nonfibrous base sheet with a composition containing halogenated rubber, wax and dimethylol urea ether resin dissolved in an organic solvent. In Example 1 of U.S. Pat. No. 2,384,132 there is illustrated the preparation of a furniture lacquer for spray application consisting of chlorinated rubber, polyvinyl acetate and chlorinated paraffin dissolved in a toluene/butyl acetate solvent blend.

In Example 2 of U.S. Pat. No. 2,388,326, regenerated cellulose film is coated with a formulation consisting of 1,2-dihydronaphthalene polymer, chlorinated rubber, paraffin wax, chlorinated paraffin wax and calcium salt of hydrogenated rosin dissolved in toluene.

U.S. Pat. No. 2,490,536 describes a composition for rendering paper, regenerated cellulose and the like moistureproof and heat sealing, which composition comprises chlorinated rubber, ethylenevinyl acetate copolymer and paraffin wax dissolved in an organic solvent such as toluene.

U.S. Pat. No. 3,200,093 describes a composition for coating milk cartons and frozen food wraps which consists of a blend of paraffin wax and chlorinated polyethylene. The composition is applied in molten form to the substrates.

U.S. Pat. No. 3,944,717 describes a coating system for a telephone surface cable which has water-resisting capability. The coating system comprises an admixture of polyvinyl chloride, chlorinated polyethylene and chlorinated paraffin, which is applied at a temperature of 220°–300° F.

As it is apparent, the prior art methods for providing substrates with moisture resistant and flame resistant surfaces generally involve coating the substrates with a halogen-containing composition dissolved in an organic solvent. In some cases, a non-volatile halogen-containing resin composition is applied to the respective substrates in a molten state. There remains a need for moisture barrier coating compositions which can be applied as protective film on substrate surfaces without the presence of a volatile solvent or the need for elevated temperatures to effect curing of polymerizable components of the coating composition.

Accordingly, it is a main object of this invention to provide a room temperature curable resin composition exhibiting properties adapted for protecting substrate surfaces with a moisture barrier coating film.

It is another object of this invention to provide a low viscosity curable coating system containing halocarbon components which contribute moisture-resistant properties to the coating system.

It is a further object of this invention to provide a curable halogen-containing coating composition which cures rapidly at ambient temperatures as a 100% solids system under the influence of ultraviolet radiation.

Other objects and advantages of this invention shall become apparent from the accompanying description and examples.

DESCRIPTION OF THE INVENTION

One or more objects of the present invention are accomplished by the provision of a radiation-curable resin composition having utility as a moisture barrier film which comprises a blend of (1) chlorinated rubber; (2) chlorinated paraffin; (3) vinyl alkanoate; (4) crosslinking monomer containing at least two polymerizable olefinically unsaturated groups; (5) photoinitiator; and (6) stabilizer.

The curable composition can be prepared by the simple expediency of dissolving the solid components (e.g., chlorinated rubber, chlorinated paraffin, photoinitiator and stabilizer) in the liquid components (e.g., vinyl alkanoate and crosslinking monomer) which function as a non-volatile solvent medium. The blending of the components can be accomplished at room temperature, or with gentle heating to accelerate the dissolution of solid components.

Chlorinated Rubber Component

The term "chlorinated rubber" is meant to include elastomeric polymers having a molecular weight range between about 10,000 and 500,000, and having a chlorine content between about 20 and 60 weight percent. Illustrative of chlorinated rubbers are elastomers such as natural rubber, styrene-butadiene rubber, poly(ethylene/propylene), polybutadiene, polyisoprene and polychloroprene which have been subjected to conventional chlorination procedures. The preparation of chlorinated hydrocarbons is described in U.S. Pat. Nos. 1,980,396; 2,403,179; 2,727,934; 3,099,644; 3,492,279; 3,919,131; and references cited therein.

In terms of solution viscosity, suitable chlorinated rubbers for the purposes of the present invention include those having a viscosity in the range between about 20 and 2000 centipoises (20% solution by weight in toluene at 25° C.).

The quantity of chlorinated rubber component employed in the present invention radiation-curable resin composition can vary in the range between about 10 and 30 weight percent, based on total composition weight. The preferred quantity of chlorinated rubber will normally average in the range between about 15 and 25 weight percent.

Chlorinated Paraffin Component

The term "chlorinated paraffin" is meant to include paraffin waxes that contain on the average between about 18 and 36 carbon atoms and have a chlorine content in the range between 40 and 85 weight percent. A typical empirical formula for a chlorinated paraffin is $C_{24}H_{29}Cl_{21}$.

Suitable chlorinated paraffins for this invention are commercially available, or they may be prepared by employing standard chlorination techniques. Suitable chlorinated paraffins typically have a melt point in the range between about 30° C. and 110° C., and an average molecular weight in the range between about 1500 and 6000. Chlorinated paraffins are commercially available under tradenames such as Chlorowax 70 (Diamond Shamrock) and Unichlor I-70AX (Neville Chemical Company).

The quantity of chlorinated paraffin component employed in the present invention radiation-curable resin composition can vary in the range between about 2 and 25 weight percent, based on total composition weight. The preferred quantity of chlorinated paraffin will normally average in the range between about 5 and 20 weight percent.

Vinyl Alkanoate Component

The vinyl alkanoate component of the invention radiation-curable resin composition is a polymerizable monomer which functions as a low viscosity solvent medium for the other composition components. The vinyl alkanoate polymerizes readily when the invention composition is subjected to ultraviolet radiation curing conditions. Effectively, the invention composition is a 100 percent solids system which cures substantially without loss of weight caused by volatilization of the vinyl alkanoate or other components.

Suitable vinyl alkanoates are those containing between 4 and about 6 carbon atoms, such as vinyl acetate, vinyl propionate, vinyl butyrate, vinyl isobutyrate, and the like.

The quantity of vinyl alkanoate component employed in the present invention radiation-curable resin composition can vary in the range between about 15 and 45 weight percent, based on total composition weight. The preferred quantity of vinyl alkanoate will normally average in the range between about 20 and 35 weight percent.

Crosslinking Monomer Component

The term "crosslinking monomer" is meant to include polyfunctional organic compounds containing at least two polymerizable olefinically unsaturated positions.

Illustrative crosslinking monomers include allyl methacrylate, divinyl benzene, diethylene glycol dimethacrylate, ethylene glycol dimethacrylate, trimethylolpropane trimethacrylate, diallyl adipate, methylenebis-acrylamide, diethylene glycol diacrylate, ethylene glycol diacrylate, diallyl fumarate, diallyl phthalate, divinyl sulfone, butylene dimethacrylate, trimethylene glycol diacrylate, butylene glycol diacrylate, pentamethylene glycol diacrylate, glyceryl triacrylate, octylene glycol diacrylate, the tetraacrylate ester of pentaerythritol, ethyl diallylphosphonate, triallylisocyanurate, and the like.

The preferred crosslinking monomers are compounds which are liquid at 25° C., and which contain 2-4 polymerizable olefinically unsaturated groups and have a molecular weight in the range between about 120 and 600. Highly preferred crosslinking monomers for the purposes of this invention include trimethylolpropane triacrylate and trimethylolpropane trimethacrylate.

The quantity of crosslinking monomer component employed in the present invention radiation-curable resin composition can vary in the range between about 10 and 40 weight percent, based on total composition weight. The preferred quantity of crosslinking monomer will typically average in the range between about 15 and 35 weight percent.

Photoinitiator Component

A conventional photoinitiator derivative is suitable for incorporation in the present invention radiation-curable resin composition.

The photoinitiator component is employed in a quantity between about 0.5 and 15 weight percent, based on total composition weight. The preferred quantity of photoinitiator will usually average in the range between about 1 and 10 weight percent.

The photoinitiator component is selected to provide fast cure response when the curable resin composition is exposed to low energy activation from a light source having a wavelength in the range between about 2000 and 6000 angstroms. Suitable light sources are sunlamps, mercury arcs, carbon arcs, tungsten filament lamps, xenon arcs, krypton arcs, and the like. The preferred resin compositions of this invention are curable in less than about 5 seconds when irradiated with ultraviolet light at room temperature.

The photoinitiator component can be added as a single compound or a mixture of compounds. Illustrative of suitable photoinitiator compounds are those disclosed in Chemical Reviews, 68 (No. 2), 125 (1968), and in U.S. Pat. Nos. 3,840,390; 3,864,133; and the like. Typical photoinitiator compounds include acyloin and derivatives thereof, such as benzoin, benzoin methyl ether, benzoin ethyl ether, benzoin isopropyl ether, benzoin isobutyl ether, desyl bromide, and $\alpha$-methylbenzoin; diketones such as benzil and diacetyl, etc.; organic sulfides such as diphenyl monosulfide, diphenyl disulfide, desyl phenyl sulfide, and tetramethylthiuram monosulfide; S-acyl dithiocarbamates, such as S-benzoyl-N,N-dimethyldithiocarbamate and S-(p-chlorobenzoyl)-N,N-dimethyldithiocarbamate; phenones such as acetophenone, $\alpha,\alpha,\alpha$-tribromoacetophenone, o-nitro-$\alpha,\alpha,\alpha$-tribromoacetophenone, benzophenone, and p,p'-tetramethyldiaminobenzophenone; sulfonyl halides such as p-toluenesulfonyl chloride; and the like.

If desired, an amine can also be incorporated in the invention curable resin composition to accelerate the rate of curing by light radiation when the photoinitiator is an aryl ketone. Amines that exhibit this synergistic rate-enhancing effect include triethanolamine, tributylamine, triethylamine, and the like.

The radiation emitting source is preferably within about twelve inches of the coating surface being cured.

Stabilizer Component

It is an essential aspect of the present invention that a stabilizer component is incorporated in the radiation-curable resin composition. The stabilizer component can be a single compound or a mixture of compounds, and can be selected from the broad variety of compounds known in the art for stabilizing halocarbon materials to the action of heat and light.

The various types of stabilizer compounds include barium, cadmium and zinc soaps and phenates, basic lead compounds, organo-tin compounds such as dialkyl tin mercaptides and dialkyltin maleates, thiolauric anhydride and n-butyl stannoic acid, epoxidized oil, alkyl diphenyl phosphites, triaryl phosphites, phenyl salicylates, benzophenones and benzotriazoles, and the like. Other stabilizer compounds known and used in the art are listed in U.S. Pat. Nos. 2,510,035; 3,200,093; 3,485,788; 3,940,355; 3,944,717; and the like. An additional listing is set forth in "Polyvinyl Chloride", H. A. Sarvetnick; Van Nostrand Reinhold Co., New York, N.Y., (1969).

The quantity of stabilizer component employed in the present invention radiation-curable composition will usually vary in the range between about 0.5 and 5 weight percent, based on total composition weight. On the average the quantity of stabilizer will vary in the range between about 1 and 4 weight percent. Employing a combination of stabilizer compounds (e.g., a tin compound and a thiuram sulfide compound) is advantageous since the combination appears to impart a synergistic enhancement of stabilizer effect.

Coating And Curing Procedures

The coating of substrates with the invention composition is accomplished by conventional application techniques such as spraying, dipping, curtain and roll coating, and the like.

The coated substrate is exposed to electromagnetic radiation having a wavelength above about 2000 angstroms and up to about 6000 angstroms. The optimal exposure time will vary, depending on such factors as film thickness, temperature, radiation power and the like. Generally, with a mercury vapor radiation power of about 200 watts per linear inch set at a distance of 12 inches from the coating surface, a present invention curable resin coating will cure within about 0.1–0.25 seconds.

Unique Features Of Invention Composition

A present invention radiation-curable resin composition is a low viscosity, 100% solids coating system which has a shelf-life up to six months at room temperature in the absence of light. The vinyl alkanoate component has excellent solvating power for the chlorinated rubber and chlorinated paraffin components, which aids in preventing formation of a precipitate under variable shelf-life conditions.

A cured coating film of a present invention resin composition exhibits exceptional moisture barrier properties. As demonstrated in the following Examples, the unique moisture barrier properties of a present invention coating film appears to be attributable to a synergistic interaction of the chlorinated rubber and chlorinated paraffin components of the composition. The combination of these components provides superior moisture barrier properties in a coating film in comparison with each of the components taken individually.

The comparative moisture barrier properties were measured on a Honeywell Moisture Barrier Tester. In the comparative tests employing a 0.2 mil coating on detergent box stock (Container Corporation Of America), a present invention coating composition permitted a rate of less than 2 grams/100 square inches/24 hours of water vapor penetration. In the case of other tested coating compositions not within the scope of the present invention, the rate of water vapor penetration was greater than 10 grams/100 square inches/24 hours.

The present invention radiation-curable resin composition has other advantages as a coating system which have commercial implications. It has been demonstrated that a present invention coating system can provide a moisture barrier coating on detergent boxes in a single coat procedure. Commercial coating systems currently in use require a base coat plus a topcoat. Further, the commercial coating systems employ a volatile solvent component and subject the coated substrate to a heating cycle in a gas-fired oven.

The following examples are further illustrative of the present invention. The reactants and other specific ingredients are presented as being typical, and various modifications can be devised in view of the foregoing disclosure within the scope of the invention.

EXAMPLE I

This Example illustrates the preparation of a preferred radiation-curable resin composition in accordance with the present invention.

The following ingredients were blended at room temperature with stirring.

|  | Weight, % |
| --- | --- |
| Chlorinated rubber[1] | 20.0 |
| Chlorinated paraffin[2] | 10.0 |
| Vinyl Acetate | 29.0 |
| Trimethylolpropane triacrylate | 30.0 |
| Benzoin ethyl ether | 9.0 |
| Dibutyl tin dimaleate | 1.0 |
| Tetramethyl thiuram monosulfide | 1.0 |

[1]Parlon S-10, Hercules
[2]Chlorowax 70, Diamond Shamrock

The curable resin composition had a pot stability greater than two weeks at 120° F.

A 0.2 mil coating on detergent box stock cured in 0.1 seconds when exposed to a mercury vapor lamp of 200 watts per linear inch power, at a distance of 12 inches.

The rate of water vapor penetration through a 0.2 mil coating as measured by a Honeywell Moisture Barrier Tester was 1.3 grams/100 square inches/24 hours.

EXAMPLE II

This Example illustrates moisture barrier test results of a present invention ultraviolet cured invention coating in comparison with other coating systems.

The results in Tables I and II demonstrate that the moisture-barrier properties of a present invention coating are enhanced by a synergistic interaction between the chlorinated rubber and chlorinated paraffin components of the coating system.

TABLE I

| MOISTURE BARRIER DATA* | | | | | | | |
| --- | --- | --- | --- | --- | --- | --- | --- |
| Run Number | A | B | C | D | E | F | G |
| Styrene-allyl alcohol[1] | 30 |  |  |  |  | 15 |  |
| Chlorinated Rubber[2] |  | 30 |  |  |  |  | 15 |
| Polyvinyl Acetate[3] |  |  | 30 |  |  |  |  |
| Maleic rosin ester[4] |  |  |  | 30 |  |  |  |
| Chlorinated paraffin[5] |  |  |  |  | 30 | 15 | 15 |
| Vinyl Acetate | 30 | 30 | 30 | 30 | 30 | 30 | 30 |
| Trimethylolpropane triacrylate | 30 | 30 | 30 | 30 | 30 | 30 | 30 |
| Benzoin Ethyl Ether | 9 | 9 | 9 | 9 | 9 | 9 | 9 |
| Dibutyl tin maleate | 1 | 1 | 1 | 1 | 1 | 1 | 1 |
| Honeywell Readings, Seconds | 11 | 11 | 8 | 8 | 8 | 11 | 106 |
| Water Vapor Transmission |  |  |  |  |  |  |  |

TABLE I-continued

MOISTURE BARRIER DATA*

| Run Number | A | B | C | D | E | F | G |
|---|---|---|---|---|---|---|---|
| (Grams/100 sq. in./24 hrs.) | 11 | 11 | 16 | 16 | 11 | 11 | 1.3 |

*Films applied to soap cartons supplied by Container Corporation of America. Films applied with a #8 wire-wound rod and cured with 1 pass at 100 fpm using a single 200 watt/linear inch Hanovia medium pressure mercury vapor lamp.
(1)RJ-100, Monsanto
(2)Parlon S-10, Hercules
(3)AYAC, Union Carbide
(4)Unirez 7003, Union Camp
(5)Chlorowax 70, Diamond Shamrock

TABLE II

MOISTURE BARRIER DATA (Cont.)

| Run Number | H | I | J | K | L | M | N |
|---|---|---|---|---|---|---|---|
| Parlon S-10 | | | 25 | 20 | 12 | 10 | 5 |
| AYAC | 15 | | | | | | |
| Unirez 7003 | | 15 | | | | | |
| Chlorowax 70 | 15 | 15 | 5 | 10 | 18 | 20 | 25 |
| Vinyl Acetate | 30 | 30 | 30 | 30 | 30 | 30 | 30 |
| Trimethylolpropane triacrylate | 30 | 30 | 30 | 30 | 30 | 30 | 30 |
| Benzoin Ethyl Ether | 9 | 9 | 9 | 9 | 9 | 9 | 9 |
| Dibutyl tin maleate | 1 | 1 | 1 | 1 | 1 | 1 | 1 |
| Honeywell Readings, Seconds | 8 | 8 | 8 | 106 | 103 | 64 | 23 |
| Water Vapor Transmission (Grams/100 sq. in./24 hours) | 13.5 | 13.5 | 13.5 | 1.3 | 1.3 | 1.8 | 5.2 |

What is claimed is:

1. A radiation-curable resin composition having utility as a moisture barrier film which comprises a blend of (1) between about 10 and 30 weight percent of chlorinated rubber; (2) between about 2 and 25 weight percent of chlorinated paraffin; (3) between about 15 and 45 weight percent of vinyl alkanoate; (4) between about 10 and 40 weight percent of crosslinking monomer containing at least two polymerizable olefinically unsaturated groups; (5) between about 0.5 and 15 weight percent of photoinitiator; and (6) between about 0.5 and 5 weight percent of stabilizer, based on the total composition weight.

2. A curable resin composition in accordance with claim 1 which is substantially a 100 percent solids coating system.

3. A curable resin composition in accordance with claim 1 wherein the chlorinated rubber component has a molecular weight in the range between about 10,000 and 500,000 and a chlorine content between about 20 and 60 weight percent.

4. A curable resin composition in accordance with claim 1 wherein the chlorinated paraffin component contains between about 18 and 36 carbon atoms and has a chlorine content between about 40 and 80 weight percent.

5. A curable resin composition in accordance with claim 1 wherein the vinyl alkanoate component contains between 4 and about 6 carbon atoms.

6. A curable resin composition in accordance with claim 1 wherein the crosslinking monomer component contains 2–4 polymerizable olefinically unsaturated groups, and has a molecular weight in the range between about 120 and 600.

7. An ultraviolet radiation-curable coating composition having utility as a moisture barrier protective film which comprises a blend of (1) between about 15 and 25 weight percent of chlorinated rubber; (2) between about 5 and 20 weight percent of chlorinated paraffin; (3) between about 20 and 35 weight percent vinyl acetate; (4) between about 15 and 35 weight percent of crosslinking monomer selected from trimethylolpropane triacrylate and trimethylolpropane trimethacrylate; (5) between about 1 and 10 weight percent of photoinitiator; and (6) between about 1 and 4 weight percent of heat and light stabilizer for the chlorocarbon components, all based on the total composition weight.

8. A curable resin composition in accordance with claim 7 which is substantially a 100 percent solids coating system.

9. A curable resin composition in accordance with claim 7 wherein the chlorinated rubber component has a molecular weight in the range between about 10,000 and 500,000 and a chlorine content between about 20 and 60 weight percent.

10. A curable resin composition in accordance with claim 7 wherein the chlorinated paraffin component contains between about 18 and 36 carbon atoms and has a chlorine content between about 40 and 80 weight percent.

* * * * *